United States Patent
Boussant-Roux et al.

(10) Patent No.: US 7,129,192 B2
(45) Date of Patent: Oct. 31, 2006

(54) MOLTEN AND CAST REFRACTORY PRODUCT WITH HIGH ZIRCONIA CONTENT

(75) Inventors: Yves Marcel Leon Boussant-Roux, Montfavet (FR); Michel Marc Gaubil, Avignon (FR)

(73) Assignee: Saint-Gobain Centre de Recherches et D'Etudes Europeen, Courbevoie (FR)

( * ) Notice: Subject to any disclaimer, the term of this patent is extended or adjusted under 35 U.S.C. 154(b) by 60 days.

(21) Appl. No.: 10/506,161

(22) PCT Filed: Feb. 28, 2003

(86) PCT No.: PCT/FR03/00663

§ 371 (c)(1),
(2), (4) Date: Aug. 31, 2004

(87) PCT Pub. No.: WO03/074445

PCT Pub. Date: Sep. 12, 2003

(65) Prior Publication Data

US 2005/0159294 A1   Jul. 21, 2005

(30) Foreign Application Priority Data

Mar. 1, 2002   (FR) .................... 02 02635

(51) Int. Cl.
*C04B 35/109* (2006.01)
(52) U.S. Cl. ............ 501/105; 501/104; 501/107; 654/374.13
(58) Field of Classification Search ........... 501/105, 501/107, 104; 65/374.13
See application file for complete search history.

(56) References Cited

U.S. PATENT DOCUMENTS 5,679,612 A * 10/1997 Endo et al. ............ 501/104

FOREIGN PATENT DOCUMENTS

| JP | 2000-302560 | * 10/2000 |
| RU | 2039026 | * 7/1995 |

OTHER PUBLICATIONS

Patent Abstracts of Japan, vol. 2000, No. 13, Feb. 5, 2001 -&JP 2000 302560 A (Toshiba Monofrax Co Ltd), Oct. 31, 2000 Tableau 3, echantillon 5. abstract.
Database WPI, Section Ch, Week 197848, Derwent Publications Ltd., London, GB; AN 1978-86594A, XP002225519, -&JP 53 121012 A (Nippon Electric Glass Co), Oct. 23, 1978 Tableau 1, echantillons 2 et 3. abstract.
Database CA Online!, Chemical Abstracts Service, Columbus, Ohio, US; Suzuki, Hitoshi: "Cast zircornia refractories with good corrosion resistance" retrieved from STN, Database accession No. 80:73711, XP002225517, abstract & JP 48 085610 A (Toshiba Monofrax Co., Ltd.) Nov. 13, 1973.
Database CA 'Online!, Chemical Abstracts Service, Columbus, Ohio, US; Adylov, G. T. et al: "Phase composition and microstructure of fused refractories in the A1203- Zr02 -mullite system": retrieved from STN, Database accession No. 121:236774, XP002225518, abstract & OGNEUPORY (1994), (6), 19-22.

* cited by examiner

*Primary Examiner*—Karl Group
(74) *Attorney, Agent, or Firm*—Young & Thompson

(57) ABSTRACT

The invention concerns a refractory product comprising more than 85% of zirconia ($ZrO_2$), characterized in that it comprises in wt. % with respect to oxides: $ZrO_2 > 92\%$, $SiO_2$: 2 to 8%, $Na_2O$: 0.12 to 1%, $Al_2O_3$: 0.2 to 2%, $0.5\% \leq Y_2O_3 + CaO \leq 2.6\%$, with the proviso that $Y_2O_3$: 0.3 to 2% and that CaO: 0.5 to 1.93%.

9 Claims, No Drawings

MOLTEN AND CAST REFRACTORY PRODUCT WITH HIGH ZIRCONIA CONTENT

The invention relates to a fused and cast refractory product with a high content of zirconia.

Refractory products include fused and cast products, which are well known in the construction of furnaces for melting glass, and sintered products.

Unlike sintered products, fused and cast products usually comprise an intergranular vitreous phase binding crystallized grains. The problems caused by sintered products and by fused and cast products, and the technical solutions adopted to overcome them, are therefore generally different. A composition developed for fabricating a sintered product is therefore not a priori usable as such for fabricating a fused and cast product, and vice-versa.

Fused and cast products, often called electrofused products, are obtained by melting a mixture of appropriate raw materials in an electric arc furnace or by any other process suited to the products concerned. The molten liquid is then cast into a mold, after which the product obtained undergoes a controlled cooling cycle.

Among fused and cast products, electrofused products having a high content of zirconia, meaning more than 85% by weight of zirconia ($ZrO_2$), are well known for their high resistance to corrosion without coloration of the glass produced and without generating defects.

Electrofused products with a high content of zirconia conventionally include silica ($SiO_2$) and alumina ($Al_2O_3$) to form an intergranular vitreous phase able to withstand effectively variations in the volume of the zirconia during its reversible allotropic transformation from the monoclinic phase to the tetragonal phase.

Electrofused products with a high content of zirconia conventionally also include sodium oxide ($Na_2O$) to prevent the formation of zircon from the zirconia and the silica present in the product. The formation of zircon is in fact harmful as it is accompanied by a volume reduction of the order of 20%, thereby creating mechanical stresses leading to cracking.

The product ER-1195 from Société Européenne des Produits Réfractaires, and constituting the subject matter of the patent EP-B-403387, is currently widely used in furnaces for melting glass. Its chemical analysis comprises approximately 94% zirconia, 4 to 5% silica, approximately 1% alumina and 0.3% sodium oxide, and is typical of products with a high content of zirconia used for glassmaking furnaces. This kind of composition confers on the product good "industrial feasibility", meaning that the fabricated blocks do not break up during fabrication or if cracks appear, there being too few cracks to render them inappropriate for their end use.

Products with a high content of zirconia may not be used in "low" temperature regions of glassmaking furnaces, i.e. where the temperatures are below 1150° C., for example in the end regions, or in furnaces in which they are in contact with certain types of glass, in particular alkali glass. In these situations, using electrofused products with a high content of zirconia leads to the formation of undesirable bubbles in the glass.

The object of the present invention is to provide a fused and cast refractory product with a high content of zirconia causing no or little bubbling under the conditions described hereinabove but having satisfactory industrial feasibility.

The object of the present invention is achieved by a refractory product comprising more than 85% zirconia ($ZrO_2$), characterized in that it comprises, as a percentage by weight based on the oxides:

$ZrO_2$ >92%
$SiO_2$: 2 to 8%
$Na_2O$: 0.12 to 1%
$Al_2O_3$: 0.2 to 2%
$0.5\% \leq Y_2O_3+CaO \leq 2.6\%$, provided that
$Y_2O_3$: 0.3 to 2%, or that
CaO: 0.5 to 1.93%.

As explained in detail hereinafter, it is surprisingly found that a composition of the above kind confers on the product of the invention good resistance to the formation of bubbles and good industrial feasibility.

According to other features of the present invention:
the product comprises, as a percentage by weight based on the oxides, at least 0.5% and/or at most 1.5% of $Y_2O_3$;
the product comprises, as a percentage by weight based on the oxides, from 2% to 6% of $SiO_2$;
the product comprises, as a percentage by weight based on the oxides, at least 0.4% and/or at most 1.6% of $Al_2O_3$;
$Na_2O$ is at least partly replaced by $K_2O$.
Preferably, the product does not comprise $P_2O_5$.

The invention also relates to the use of a refractory product according to the invention in an end region of a glassmaking furnace and/or in a glassmaking furnace for fabricating alkali glass.

The invention also provides a method of fabricating a refractory product comprising mixing of raw materials, melting of said mixture, and casting of said molten mixture into a mold, said raw materials comprising at least alumina ($Al_2O_3$), zirconia ($ZrO_2$), silica ($SiO_2$), and sodium oxide ($Na_2O$).

The method is noteworthy in that said raw materials further comprise at least one oxide selected from calcium oxide CaO and yttrium oxide $Y_2O_3$, the quantities of said raw materials being determined so that said refractory product conforms to the invention.

In the product of the invention, the silica content must not exceed 8% if a minimum content of zirconia is to be assured, and thus a satisfactory resistance to corrosion.

The content of sodium oxide $Na_2O$ must not exceed 1% if the resistance to corrosion is not to be degraded.

However, according to the invention, the content of sodium oxide ($Na_2O$) must be greater than 0.12% by weight based on the oxides.

This is because $Na_2O$ acts as an inhibitor in the reaction transforming zirconia+silica into zircon that gives rise to cracks. $Na_2O$ may be replaced at least in part by $K_2O$.

The following nonlimiting experiments are described with the aim of illustrating the invention.

The following raw materials were used in the experiments:

CC10 zirconia from Société Européenne des Produits Réfractaires, containing primarily, on average, by weight, 98.5% of $ZrO_2+HfO_2$, 0.5% of $SiO_2$ and 0.2% of $Na_2O$, zircon sand providing, by weight, approximately 33% silicon and 67% zirconia, AC44 alumina from Pechiney containing on average, by weight, 99.4% $Al_2O_3$, sodium carbonate contributing, by weight, 58.5% $Na_2O$, yttrium oxide more than 99% pure, and calcium carbonate contributing, by weight, 56% CaO.

For each experiment, the raw materials were metered and mixed so that the mixture comprised, in percentage by weight based on the oxides, the proportions of oxides indicated in the line of Table 2 corresponding to the experiment. The majority constituent, $ZrO_2$, constitutes the remainder to 100%.

The chemical analysis of the product constituting the blocks is given in Table 2. This is an average chemical analysis expressed as a percentage by weight based on the oxides of the product.

The mixture was then melted using the conventional arc furnace melting process.

The molten material was cast into molds to obtain blocks 200 mm×400 mm×150 mm.

Samples in the shape of crucibles with an inside diameter of 30 mm and an outside diameter of 50 mm were taken from each block. To perform a bubbling test, a sample was filled to a depth of 20 mm with oxide glass containing a high percentage (22%) of alkaline compounds ($Na_2O+K_2O$). The combination was then heated to a temperature of 1120° C. in still air to reproduce the temperature and atmosphere conditions characteristic of industrial use.

After cooling the glass, the number of bubbles in the glass filling the test crucible was evaluated and a bubble index (IB) was determined, ranging from 0 (glass free of bubbles) to 10, being proportional to the number of gas bubbles trapped in the glass. If there is a very high level of bubbling (above IB=10), then a foaming phenomenon (M) is considered to be present.

To be satisfactory, a product must have a bubble index less than or equal to 5.

In addition to good resistance to the bubbling phenomenon, the product must have a good "industrial feasibility", meaning that the fabricated parts must not break up during fabrication or comprise a number of cracks making them inappropriate to their end use.

In the tests reported hereinafter, feasibility was evaluated by visual examination of the blocks by a person skilled in the art. The person skilled in the art evaluated if the product was acceptable for a glassmaking furnace application and assigned a feasibility index (IF) accordingly, as follows:

TABLE 1

| Visual examination of blocks 200 × 400 × 150 mm | IF |
|---|---|
| No visible defects | 3 |
| A few cracks present, but blocks acceptable | 2 |
| Blocks broken up or cracked unacceptably | 1 |

To simulate the thermal variations encountered by the refractory blocks of glassmaking furnaces, the samples from tests 14 to 17 were subjected to heat treatment at 1250° C. for 48 hours before being cooled and then subjected to the bubbling test.

TABLE 2

| Experiment | Composition of the product tested (weight % on the basis of the oxides) | | | | | | | | | Results | |
|---|---|---|---|---|---|---|---|---|---|---|---|
| | $SiO_2$ | $Al_2O_3$ | $Na_2O$ | CaO | MgO | $Y_2O_3$ | $TiO_2$ | $CeO_2$ | $V_2O_5$ | IF | IB |
| Ref | 4.3 | 1.2 | 0.3 | / | / | / | / | / | / | 3 | M |
| 1 | 4.25 | 1.15 | 0.35 | / | / | / | 0.6 | / | / | 3 | 5 |
| 2 | 4.1 | 1.07 | 0.3 | / | / | / | 1.26 | / | / | 3 | 1 |
| 3* | 4.2 | 1.18 | 0.33 | / | / | 0.7 | / | / | / | 2 | 5 |
| 4* | 4.39 | 1 | 0.44 | / | / | 1.1 | / | / | / | 2 | 4 |
| 5* | 4.19 | 1.37 | 0.27 | / | / | 1.4 | / | / | / | 2 | 1 |
| 6 | 3.8 | 1.23 | 0.28 | / | / | / | / | / | 0.3 | 3 | 2 |
| 7 | 4.12 | 1.5 | 0.31 | / | / | / | / | / | 0.5 | 3 | 1 |
| 8* | 4.54 | 1.44 | 0.33 | 0.76 | / | / | / | / | / | 3 | 1 |
| 9* | 4.26 | 1.34 | 0.31 | 1.9 | / | / | / | / | / | 3 | 1 |
| 10 | 5.26 | 1.38 | 0.5 | / | 0.57 | / | / | / | / | 3 | M |
| 11 | 4.3 | 0.92 | 0.57 | / | 1.04 | / | / | / | / | 3 | M |
| 12 | 3.73 | 1.02 | 0.33 | / | / | / | / | 0.57 | / | 3 | M |
| 13 | 4.32 | 1.21 | 0.37 | / | / | / | / | 1.3 | / | 3 | M |
| 14 | 4.25 | 1.15 | 0.35 | / | / | / | 0.6 | / | / | 3 | M |
| 15 | 4.12 | 1.5 | 0.31 | / | / | / | / | / | 0.5 | 3 | M |
| 16* | 4.2 | 1.18 | 0.33 | / | / | 0.7 | / | / | / | 2 | 4 |
| 17* | 4.26 | 1.34 | 0.31 | 1.9 | / | / | / | / | / | 3 | 2 |
| 18* | 4.03 | 1.41 | 0.29 | 1.21 | / | 1.07 | / | / | / | 2 | 2 |
| 19* | 3.76 | 1.54 | 0.16 | 1.45 | / | 0.75 | / | / | / | 2 | 3 |
| 20* | 3.35 | 1.44 | 0.24 | 1.93 | / | 0.67 | / | / | / | 2 | 3 |
| 21* | 3.45 | 1.39 | 0.23 | 1.65 | / | 0.64 | / | / | / | 2 | 2 |
| 22* | 3.91 | 1.45 | 0.32 | 1.31 | / | 0.76 | / | / | / | 2 | 1 |
| 23 | 3.6 | 1.37 | 0.25 | 1.45 | / | 1.45 | / | / | / | 1 | 2 |
| 24 | 3.81 | 1.25 | 0.20 | 1.22 | / | 1.48 | / | / | / | 1 | 2 |
| 25* | 4.35 | 1.20 | 0.30 | / | / | 0.40 | / | / | / | 2 | 5 |
| 26* | 4.10 | 0.90 | 0.65 | / | / | 1.70 | / | / | / | 3 | 2 |
| 27* | 3.90 | 1.95 | 0.30 | / | / | 1.20 | / | / | / | 3 | 2 |
| 28 | 4.03 | 2.48 | 0.35 | / | / | 1.23 | / | / | / | 1 | 2 |
| 29* | 7.52 | 1.20 | 0.5 | / | / | 1.18 | / | / | / | 2 | 3 |

*product of the test conforming to the invention.

Comparing the results obtained with the reference product (REF) and with the products of experiments 1–2, 3–5, 6–7 and 8–9 shows that the presence of $TiO_2$, $Y_2O_3$, $V_2O_5$, and CaO, respectively, reduces the bubble index IB.

The content of these oxides must preferably be limited, however, so that the percentage of zirconia remains above 92% in order to ensure excellent resistance to corrosion by the molten glass.

On the other hand, comparing the results obtained with the reference product (REF) and with the products of experiments 10–11 and 12–13 shows that the presence of MgO or $CeO_2$, respectively, has significantly no influence on the bubble index IB.

Comparing the results of experiments 14, 15, 16 and 17 with those of experiments 1, 7, 3 and 9, respectively, shows that the positive impact of the presence of vanadium oxide $V_2O_5$ (experiment 15) or titanium oxide $TiO_2$ (experiment 14) is significantly degraded by the heat treatment to which the samples 14 to 17 were subjected before undergoing the bubble test.

The presence of vanadium oxide or titanium oxide is therefore unacceptable for use in a glassmaking furnace where incidents may lead to shutting down and then restarting the furnace. Moreover, the presence of these oxides may have a harmful effect of coloration of the glass.

For these reasons, adding $V_2O_5$ or $TiO_2$ does not constitute a solution to the problem of bubbles forming at low temperatures in electrofused products with a high content of zirconia.

The positive role of calcium oxide and yttrium oxide is confirmed, regardless of the history of the product, i.e. even if the product has been subjected to heat treatment beforehand (experiments 16 and 17).

According to the invention, minimum contents of 0.5% CaO and of 0.3% $Y_2O_3$ are necessary for the positive impact on bubble formation to be significant. On the other hand, it becomes much more difficult to achieve industrial feasibility beyond 2% $Y_2O_3$.

According to the invention, the content of yttrium oxide must be less than or equal to 2%, preferably 1.5%.

Calcium oxide contents exceeding 1.93% lead to the formation of calcium aluminate crystals in the vitreous phase containing $Al_2O_3$ and CaO. The presence of these crystals may lead to the product fracturing. Moreover, such contents of CaO may lead to dissolving of the zirconia crystals, which reduces the corrosion resistance of the product.

According to the invention, the content of calcium oxide must be less than or equal to 1.93%.

Moreover, experiments 18 to 24 show that CaO and $Y_2O_3$ may be used conjointly to inhibit the phenomenon of bubble formation at low temperatures. However, the total content of these two additives must not exceed 2.6%, as otherwise the feasibility of the blocks is greatly degraded, as shown by experiments 23 and 24.

The presence of CaO and/or $Y_2O_3$ in a fused and cast refractory product with a high content of zirconia, which is a requirement of the product according to the invention, is generally considered to be harmful in the prior art.

For example, FR-A-2478622 proposes to add $P_2O_5$ to improve feasibility and indicates that $Fe_2O_3$, $TiO_2$, MgO and CaO are impurities with no advantageous role, whose content must be limited. This prior art document also specifies that rare earth oxides, including yttrium oxide, are considered to have a harmful effect and that their total content must be limited to 0.5% and preferably to 0.1%.

Samples from experiment 21 were used to test the aptitude of the product of the invention to leach stones, also referred to as "defect leaching" and to test its corrosion resistance. The results were compared to those obtained with a sample of the reference product (REF) simultaneously subjected to the same tests.

To compare the aptitude to leaching defects, the samples were immersed for 48 hours in alkali-lime glass at 1500° C. Like the reference product, the product of the invention had an extremely low or even zero level of defect leaching.

To evaluate the corrosion resistance, the samples were rotated for 72 hours in a bath of alkali-lime glass at 1500° C. The non-corroded volume of the sample of the product of the invention (experiment 21) was equal to approximately 90% of the non-corroded volume of the reference sample (REF).

This level of corrosion resistance is entirely acceptable for the use of these products in glassmaking furnaces, in particular in their end regions.

The product of the invention therefore has the qualities recognized for prior art products with a high content of zirconia, namely corrosion resistance and resistance to defect leaching.

Crystallographic analysis of the products of the invention reveals more than 85% zirconia in monoclinic form, meaning that the zirconia is not significantly stabilized.

The invention claimed is:

1. Refractory product comprising, as a percentage by weight based on the oxides:
   $ZrO_2$ >92%,
   $SiO_2$: 2 to 8%,
   $Na_2O$: 0.12 to 1%,
   $Al_2O_3$: 0.2 to 2%,
   0.5% ≦ $Y_2O_3$+CaO ≦ 2.6%, and
   $Y_2O_3$: 0.3 to 2%.

2. Product according to claim 1, comprising, as a percentage by weight based on the oxides, at least 0.5% and/or at most 1.5% of $Y_2O_3$.

3. Product according to claim 1 comprising, as a percentage by weight based on the oxides, from 2% to 6% of $SiO_2$.

4. Product according to claim 1 comprising, as a percentage by weight based on the oxides, at least 0.4% and/or at most 1.6% of $Al_2O_3$.

5. Product according to claim 1, wherein $Na_2O$ is at least partly replaced by $K_2O$.

6. Product according to claim 1, which does not comprise $P_2O_5$.

7. An end region of a glassmaking furnace comprising said refractory product conforming to claim 1.

8. A glassmaking furnace for fabricating alkali glass comprising said refractory product conforming to claim 1.

9. Method of fabricating a refractory product comprising mixing raw materials, melting of said mixture, and casting of said molten mixture into a mold, said raw materials comprising at least alumina ($Al_2O_3$), zirconia ($ZrO_2$), silica ($SiO_2$), sodium oxide ($Na_2O$) and yttrium oxide ($Y_2O_3$),
   wherein said raw materials optionally further comprise calcium oxide (CaO), the quantities of said raw materials being determined so that said refractory product conforms to claim 1.

* * * * *